United States Patent [19]
Zeller

[11] Patent Number: 4,662,238
[45] Date of Patent: May 5, 1987

[54] STEERING WHEEL FOR AUTOMOTIVE VEHICLES AND PROCESS FOR ITS MANUFACTURE

[75] Inventor: Gregor Zeller, Aschaffenburg, Fed. Rep. of Germany

[73] Assignee: Petri Aktiengesellschaft, Fed. Rep. of Germany

[21] Appl. No.: 682,494

[22] Filed: Dec. 18, 1984

Related U.S. Application Data

[63] Continuation of Ser. No. 521,012, Aug. 9, 1983, abandoned, which is a continuation of Ser. No. 347,412, Feb. 10, 1982, abandoned, which is a continuation of Ser. No. 110,473, Jan. 8, 1980, abandoned.

[30] Foreign Application Priority Data

Jan. 8, 1979 [DE] Fed. Rep. of Germany ....... 2900513

[51] Int. Cl.⁴ .............................................. B62D 1/04
[52] U.S. Cl. ..................................... 74/552; 403/174; 29/159 B
[58] Field of Search ................... 74/552; 403/170, 174, 403/178; 29/159 B

[56] References Cited

U.S. PATENT DOCUMENTS

| 1,388,806 | 8/1921 | Dover | 74/552 |
| 1,801,283 | 4/1931 | McManus | 74/552 |
| 2,425,240 | 8/1947 | George | 74/552 |
| 3,613,476 | 10/1971 | Cunningham | 74/552 |

Primary Examiner—Alexander Grosz
Assistant Examiner—Rodney M. Lindsey
Attorney, Agent, or Firm—Robert J. Koch

[57] ABSTRACT

A steering wheel for automotive vehicles is produced by a process of die casting light weight component parts to eliminate the need for extensive welding and self-supporting parts of heavy mass. The component parts comprise a steering wheel hub member and a steering wheel rim member joined together by a plurality of spokes connected to the rim through a sleeve connector member. The rim and spoke members may be of tubular light weight metal.

7 Claims, 4 Drawing Figures

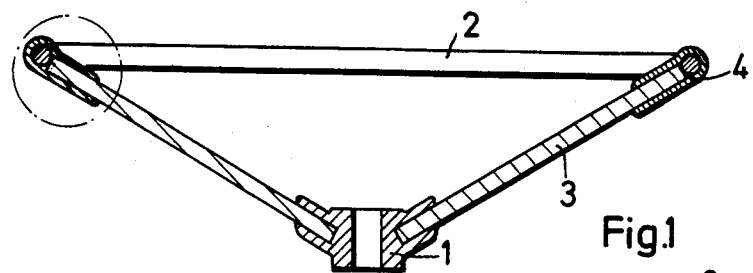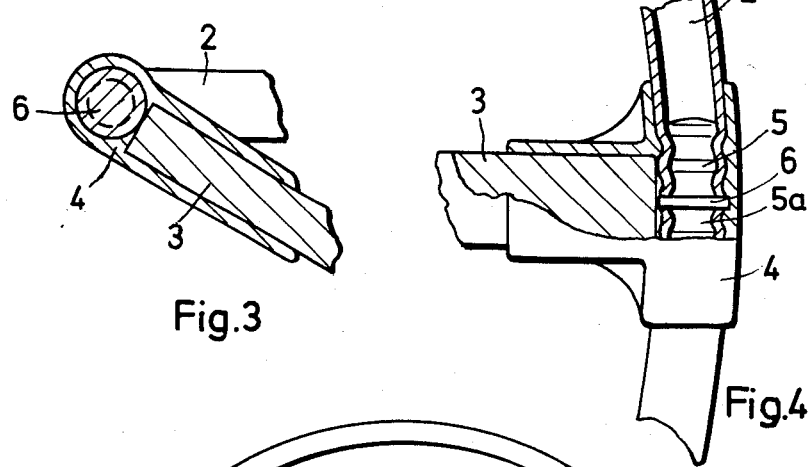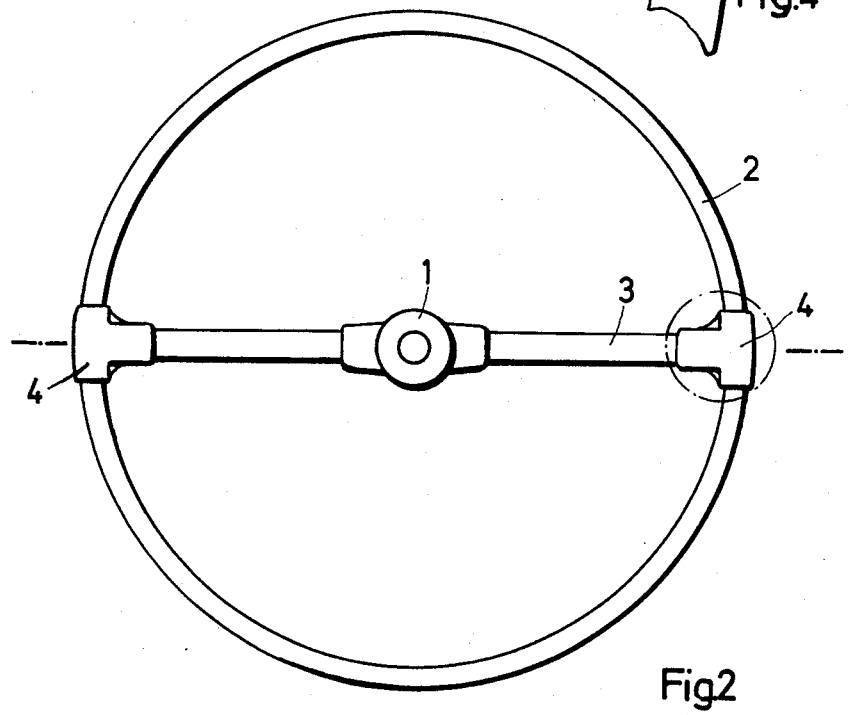

STEERING WHEEL FOR AUTOMOTIVE VEHICLES AND PROCESS FOR ITS MANUFACTURE

This application is a continuation of application Ser. No. 521,012, filed Aug. 9, 1983, which in turn is a continuation of Ser. No. 347,412 filed Feb. 10, 1982, which in turn is a continuation of Ser. No. 110,473 filed Jan. 8, 1980 now abandoned.

BACKGROUND OF THE INVENTION

The present invention relates to steering wheels for automotive vehicles comprising a steering wheel hub consisting of a light metal die casting and a steering wheel gear rim connected by means of spokes with the steering wheel hub. The invention also concerns the process for the manufacture of steering wheels.

In known steering wheels the inserts of the steering wheel spokes consist of steel shaped parts joined with the steering wheel hub into a skeleton body. To connect the respective parts, a cast joint must be provided from the spoke inserts to the hub and a welded joint is provided from the spoke inserts to the steering wheel rim. Another welded joint at the driving surface of the rim which is bent from a rod shape into an annulus is also provided. Because of this construction, the manufacture of the steering wheel skeletons requires a significant number of welding operations, the number depending on the number of steering wheel spokes. For production technological reasons the superposition of two welded joints must be avoided.

Another disadvantage of known steering wheels consists of the fact that they frequently are of an undesirable total weight. This detrimentally affects the steering behaviour of the vehicle. Because of the great mass particularly in the rim area remote from the hub and the resulting high kinetic energy, there is often a deflection of the steering wheel past its center position in the opposite direction during the automatic return of the steering wheel after steering deflections. Under certain conditions, this may lead to the straying of the vehicle from its intended direction of travel. Therefore, there has long been a need for a steering wheel satisfying all mechanical and safety requirements, that is, light in weight and that consists particularly in its rim of a hollow shape. One of the problems of the manufacture of such a steering wheel has always been the difficulty of providing a strong and safe welded joint between the solid spokes and the hollow configurations of the rim.

SUMMARY OF THE INVENTION

It is an object of an embodiment of the present invention to provide a steering wheel for automotive vehicles having a low internal mass. The invention consists of a steering wheel having its spokes positively secured in the hub and the steering wheel rim insert representing a tubular shape, positively against the free front surfaces of the spokes, by means of die-cast light metal sleeve encompassing both the insert of the steering wheel rim and the spoke.

The invention provides a steering wheel which makes it possible to obtain substantial savings of weight especially in the areas far from the hub where the highest peripheral velocities are attained during the automatic return of the wheel, both by means of material selection and design layout. The parts are joined exclusively by mechanical means so that the disadvantages arising from material joining by welding, particularly the reduction of cross sections in the joints, are completely avoided. The invention thus makes it feasible to use thin-walled tubular shapes of light metal with tubular wall thicknesses as small as 1 5 mm employed as the rim insert and possibly employed as the spoke insert, wherein reinforcement of the tubular shapes may become necessary merely in the areas enclosed by the hub on the one hand, and the sleeve on the other, to prevent the collapse of the tubular shape in these areas.

The steering wheel according to the invention allows the simple manufacture of the parts by die casting. Both joints are produced by the die casting process, wherein the joining of the hub and the spoke insert may be effected already during the manufacture of the hub by casting around the spoke inserted in the casting die and the joining of the spokes with the rim of the steering wheel correspondingly in a single working step by die casting the sleeve over the rim and spoke parts to be joined. The parts are first clamped in a suitably shaped mold. In this arrangement (and in a manner different from existing steering wheels) the driving surface of the rim insert may abut directly against the spoke of the steering wheel and may be included in the connecting sleeve. The insert of the steering wheel rim may consist of a single piece tube section bent into an annulus, the ends thereof being interconnected by means of a double nipple flange inserted in both ends of the tube section and an annular flange protruding past the cross section of the tube. The nipples may thereby be provided with one or a plurality of circumferential grooves and the ends of the tube rolled into the grooves. In this manner, the cross section of the tube is stabilized against the casting pressure in the terminal area of the tube and at the same time an immovable positive joint is obtained within this area by means of the fluting of the tubing surface. The annular flange extending slightly past the cross section of the tube serves firstly as a stop for both ends of the tube and thus prevents the entry of the molten casting material into the tube and secondly, as a spacer with respect to the front surface of the spokes, which insures the complete filling of all of the dead corner areas during the casting process. The double nipple further serves as a large heat conducting cross section for the removal of the heat introduced by the casting material. In a similar manner, the insert of the steering wheel rim may consist of several partial lengths, determined by the angular position of the spokes, whereby the abutting ends of the partial lengths are joined in the above-described manner and made to contact the front surfaces of the spokes of the steering wheel while being secured against collapsing during the casting under pressure in a suitable manner. This may be accomplished, for example, by the insertion of plugs closing off the ends of the tube.

BRIEF DESCRIPTION OF THE DRAWINGS

Specific embodiments of the invention are illustrated in the drawing.

FIG. 1 shows a cross section through a steering wheel according to the invention;

FIG. 2 represents a top view of FIG. 1;

FIG. 3 is an enlarged representation of the encircled portion of FIG. 1;

FIG. 4 is an enlarged partial section of the encircled portion of FIG. 2.

DESCRIPTION OF THE PREFERRED EMBODIMENTS

In the drawing 1 designates the hub of the steering wheel, 2 the rim of the steering wheel and 3 the steering wheel spokes which are interconnected positively both at the joint of the hub and the spoke and at the joint of the spoke and the steering wheel rim. In a preferred embodiment the spokes are cast into the hub during the manufacture of the hub. The joint between the spoke and the rim of the steering wheel is effected positively through a connecting sleeve 4. The sleeve is die cast of a light metal. The connecting sleeve 4 has a sleeve member 7 extending in the direction of the hub. A sleeve member 8 extends in the circumferential direction as shown in FIG. 4. In a preferred embodiment sleeve members 7 and 8 forming connecting sleeve 4 encompass the spoke and the insert of the steering wheel rim respectively. The rim of the steering wheel 2 consists in a preferred embodiment of a tubular annulus which may be of a single piece or may be divided into two parts so that the abutting edges of the annular tube sections are always within the range of the connecting sleeve 4. This preferred form also displays two spokes as shown in FIG. 2 and two connecting sleeves. To close the ring and to connect the annular tube sections a double nipple flange 5, 5a (see FIGS. 3 and 4) with an annular flange 6 protruding over the cross section of the tube is provided. The double nipple 5, 5a is equipped with two circumferential grooves upon which the two ends of the tube are rolled after the insertion of the nipples to abut against the annular flange 6. The double nipple flange and annular flange in combination form a plurality of surface flutings 9.

The process for the manufacture of the steering wheel comprises a conventional casting procedure with additional important features as exemplified in the following method of making the steering wheel of FIG. 2.

EXAMPLE

One end each of two rods forming the spokes 3 are clamped into a mold corresponding to the outline of the hub 1. Light metal for molding is poured into the mold and surrounds the inserted ends. Two sections of tubing 2 in the forms of semicircular rings are joined in a ring by placing the ends of the tubes onto each of the double nipples 5, 5A. The tubular material is rolled into the grooves of the nipples to secure them in place. This interconnecting area of tubing is then placed in a casting mold together with the hub spokes preform. The casting mold forms the sleeve 4 upon casting with molten light metal. It also joins the spokes to the annulus without the need for a welded joint.

I claim:

1. A steering wheel for automotive vehicles comprising:
   a steering wheel hub member suitable for connection with a steering column;
   a tubular steering wheel rim fixedly cooperating with said steering wheel hub through a plurality of spokes and having at least two end portions, said end portions adjoining one another to form an annular shape of said rim by means of a double nipple flange portion, said nipples displaying circumferentially closed grooves defining a fluted surface; said end portions of said steering wheel rim member display matching external grooves thereby forming an internal fluted surface matching the fluted surface defined on said nipples;
   a connector sleeve member for each spoke, fixedly joining said spoke to said rim and fixedly joining said adjoining end portions;
   wherein said connector sleeve member forms an immovable positive joint with the ends of said steering wheel rim member by internally disposed circumferential grooves defining a fluted surface matching the grooves disposed on the rim member end portions for molding around the fluted surfaces of said end portion.

2. The steering wheel of claim 1 wherein said connector sleeve member comprises a spoke receiving portion extending in a direction radially toward said steering wheel hub and a rim member receiving portion.

3. The steering wheel of claim 1 wherein said spokes and rim member comprise different materials.

4. The steering wheel of claim 1 wherein said rim member is comprised of a plurality of tubular sections adjoining together by a plurality of connector sleeve members.

5. The steering wheel of claim 2 wherein the external grooves on each adjoining end portion of said steering wheel rim member communicates with said rim member receiving portion.

6. The steering wheel of claim 5 wherein an annular flange member of said double nipple flange portion closes an annulus formed by said rim member.

7. The steering wheel of claim 6 wherein said annular flange member comprises a disk-like shape with a diameter larger than the diameter of said steering wheel rim member.

* * * * *